United States Patent
Maiwald et al.

[11] Patent Number: 5,836,399
[45] Date of Patent: Nov. 17, 1998

[54] SPRAYER WHEEL SHIELD

[75] Inventors: Marvin Anthony Maiwald; Scott Charles Steege, both of Ankeny, Iowa

[73] Assignee: Deere & Company, Moline, Ill.

[21] Appl. No.: 703,587

[22] Filed: Aug. 27, 1996

[51] Int. Cl.⁶ .................................................. B62D 25/16
[52] U.S. Cl. ............................ 172/509; 280/157; 293/58
[58] Field of Search ...................... 172/508, 509, 172/512, 517; 47/1.7, 1.01 R; 280/156, 157; 293/58, 42, 15

[56] References Cited

U.S. PATENT DOCUMENTS

| | | |
|---|---|---|
| 1,099,058 | 6/1914 | Kruckow . |
| 2,822,216 | 2/1958 | Finley et al. . |
| 3,588,136 | 6/1971 | Schlueter . |
| 4,583,319 | 4/1986 | Wolff et al. ................................ 47/1.7 |
| 5,241,780 | 9/1993 | Zaun et al. ................................ 47/1.7 |
| 5,511,808 | 4/1996 | Rowland ................................ 280/157 |

Primary Examiner—Terry Lee Melius
Assistant Examiner—Christopher J. Novosad

[57] ABSTRACT

A wheel shield for a self-propelled sprayer includes a double wall plastic body with a profile designed to protect plants and provide smooth surfaces that resist build up of debris. A support and aligning rod assembly extending upwardly from the wheel hub includes locating pins to receive and initially support the plastic body so that mounting holes on the body sidewalls can be easily aligned with mating structure bracket structure on the wheel support. The inside wall of the body is connected to a bracket fixed to the wheel hub. A bearing is fixed to the outside wall of the body, and a mating hub mounting member is connected to the wheel hub. A bolt placed through the bearing and threaded into a nut fixed to the hub mounting member provides support for the body from the wheel hub without need for metal frames or similar supporting structure. The body terminates at a lower edge offset a substantial distance above the ground, and a flexible shield bottom is mounted on the lower edge to protect the body during shield contact with the ground or obstacles.

20 Claims, 3 Drawing Sheets

SPRAYER WHEEL SHIELD

BACKGROUND OF THE INVENTION

1) Field the Invention

The present invention relates generally to agricultural sprayers and more specifically to wheel shields for a self-propelled sprayer.

2) Related Art

Sprayers such as the John Deere Model 6500 Hi-Cycle Sprayer include a main frame supported by a steerable wheel and a pair of drive wheels on transversely adjustable drop axles for movement between rows of crops. Wheel shields such as shown in U.S. Pat. No. 5,241,780 are provided and include plastic body with a profile designed to control the path of shield deflection and return the body to original shape after deflection. The shield is mounted on a steel framework also designed to help control deflection and assure return to the original shape. A bail limits maximum shield deflection and increases the strength of the metal framework.

Although the plastic shields are lighter and more resistant to corrosion than metal shields, the relatively large metal framework is heavy, and attachment of the shields, particularly on larger sprayers, requires at least two people for positioning and alignment of components. The attachment process can therefore be quite arduous and time consuming. In addition, the framework catches debris such as corn stalks, and premature tire wear can result from a build-up of the debris rubbing against the tire. Cleaning the inside of the shields is a problem because of non-smooth areas resulting from the addition of the framework. Further, present single wall shields made for conventional sprayers are often inadequate for the larger wheels of new, higher capacity sprayers such as the John Deere model 4700 Sprayer. The shields for such sprayers as the model 4700 with all-wheel hydraulic drive must also be mountable on large steerable wheel structures which include hydraulic motors.

The shields of the type described in the aforementioned U.S. Pat. 5,241,780 have eliminated some of the problems caused by contact with objects or the soil, but shield damage can occur, particularly over irregular surface conditions, when the lower portion of the shield bottoms against the ground. The shield must project downwardly to a location near ground surface for good plant protection, but such projection results in frequent ground and obstacle contacts that can damage the shield.

BRIEF SUMMARY OF THE INVENTION

It is therefore an object of the present invention to provide an improved shield for a sprayer which overcomes the aforementioned problems.

It is another object of the present invention to provide an improved shield for a sprayer which is easier to mount and which eliminates the problems associated with shields having relatively massive metal frames. It is yet another object to provide such a shield with alignment structure that makes mounting easy and fast. It is a further object to provide such a shield which is larger than previously available shields and yet which can be mounted and removed by one person.

It is another object to provide an improved plastic shield having increased strength. It is a further object to provide such a shield which obviates large metal framework and which is less prone to clogging with debris and is easier to clean than at least most previously available shields.

It is still another object to provide improved wheel shield structure for relatively large hydraulically driven wheels of an implement such as a four-wheel drive, self-propelled sprayer. It is another object to provide such a shield structure which is stronger and yet easier to mount than at least most previously available structures utilized on smaller self-propelled sprayers.

It is another object of the present invention to provide a wheel shield that is light in weight and strong, and which is less prone to damage caused by the lower portion of the shield impacting the ground.

A wheel shield constructed in accordance with the teachings of the present invention includes a double wall plastic body with a profile designed to protect plants. The lower edge of the double wall body terminates just below the wheel hub a substantial distance above the ground, and a replaceable flexible extension or shield bottom is fixed to the lower edge to provide good plant protection while eliminating shield damage caused by shield contact with the ground or with obstacles.

A support rod extending upwardly from the wheel hub includes locating pins to receive an apertured portion of the shield body. During mounting, the rod initially supports the plastic body at a location above the center of gravity of the body so that one person can easily align mounting holes in the shield with corresponding apertures in bracket structure on the drop axle and secure the shield with mounting bolts. The inner sidewall of the body is connected to a bracket fixed to the wheel hub. A bearing is fixed to the outer sidewall of the body, and a mating hub mounting member is connected to the wheel hub. A bolt placed through the bearing and threaded into a nut fixed to the hub mounting member to provide additional support for the body independently of U-shaped metal frames or the like.

The shield construction eliminates large, heavy metal frames, and the smooth interior surface resists debris buildup and cleans easily. The support permits one person to initially lift and position the body on the rod utilizing the locating pins. Thereafter, the bolts are connected through the body sidewalls to the bracket and into the drive mount casting. One person can easily mount and remove the shield. The shield is mounted independently of an optional fender. The replaceable flexible extension helps eliminate shield body breakage when the shield structure encounters an obstacle or irregular ground surfaces.

These and other objects, features and advantages of the present invention will become apparent to one skilled in the art upon reading the following detailed description in view of the drawings.

DETAILED DESCRIPTION OF THE DRAWINGS

Figure 1:
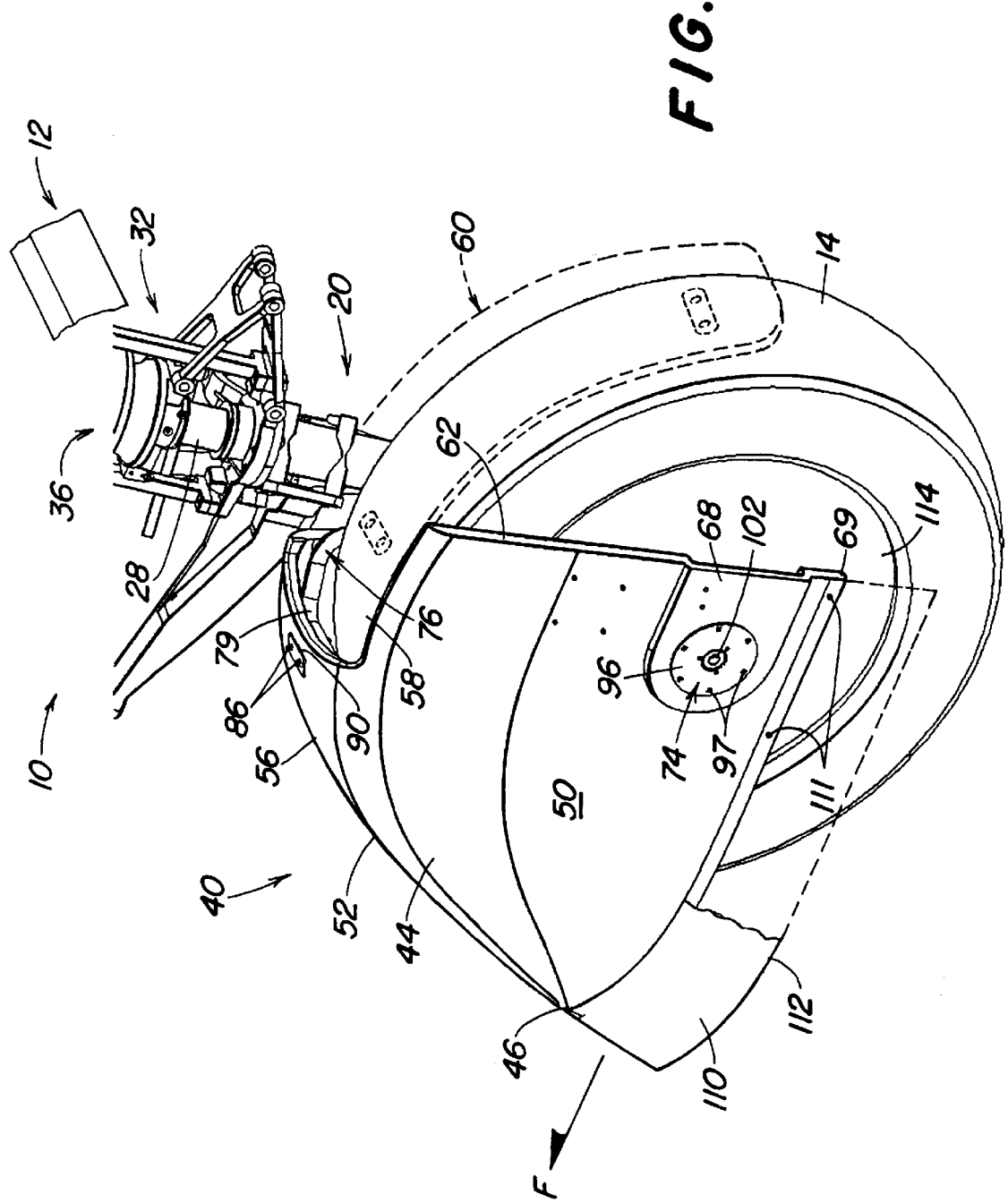
FIG. 1 is a perspective view of a portion of a sprayer including a drop axle assembly with the shield structure of the present invention attached thereto.

Referring now to FIG. 1, therein is shown a portion of a self-propelled sprayer or chemical applicator 10 having a main frame 12 supported for forward movement (F) over a field with parallel rows of plants by forward steerable drive wheels 14. The drive wheels are carried at the lower ends of a pair of transversely spaced, steerable drop axle assemblies 20 having upper ends supported from the main frame 12. The drop assemblies 20 extend a substantial distance vertically from the wheels 14 and provide good under-axle crop clearance for working in mature crops.

The wheel 14 runs between two adjacent rows of plants, and drop assemblies 20 are transversely adjustable to adjust wheel tread to accommodate different row spacings or patterns that may be encountered from field to field. The wheel 16 is mounted on a hub 22 (FIGS. 2 and 3) of a hydraulic motor located within a drive mount casting 24 supported at location 26 by the lower end of a spindle 28 (FIG. 1). The spindle 28 is slidably and rotatably mounted in a spindle journal fixed to main frame 12. An upper steering assembly 32 is connected near the top of the spindle 28 for turning the spindle and steering the wheel 14, and an uppermost airspring assembly 36 provides cushioning. The sprayer 10 preferably is of the type exemplified by the commercially available John Deere model 4700 Sprayer.

Shield structure 40 is supported adjacent the wheel 14 and prevents the wheels from smashing the crop during spraying. The shield structure 40 includes a double wall, rotationally molded plastic body 44 having a lower, forward nose portion 46 diverging outwardly to opposed inner and outer sidewalls 48 and 50 extending in the rearward direction from the nose portion 46. A forward wall 52 extends upwardly and rearwardly from the nose portion 46 to an upper wall 56 which connects the upper, central portions of the sidewalls 48 and 50 immediately forward of a fender accommodation space indicated generally at 58. An optional fender 60 (broken lines of FIG. 1) may also be supported from the drop assembly 20. The shield body 44 terminates in aft edges 61 and 62 generally lying in an upright planes with the edge 61 located forwardly of the edge 62.

Figure 2:
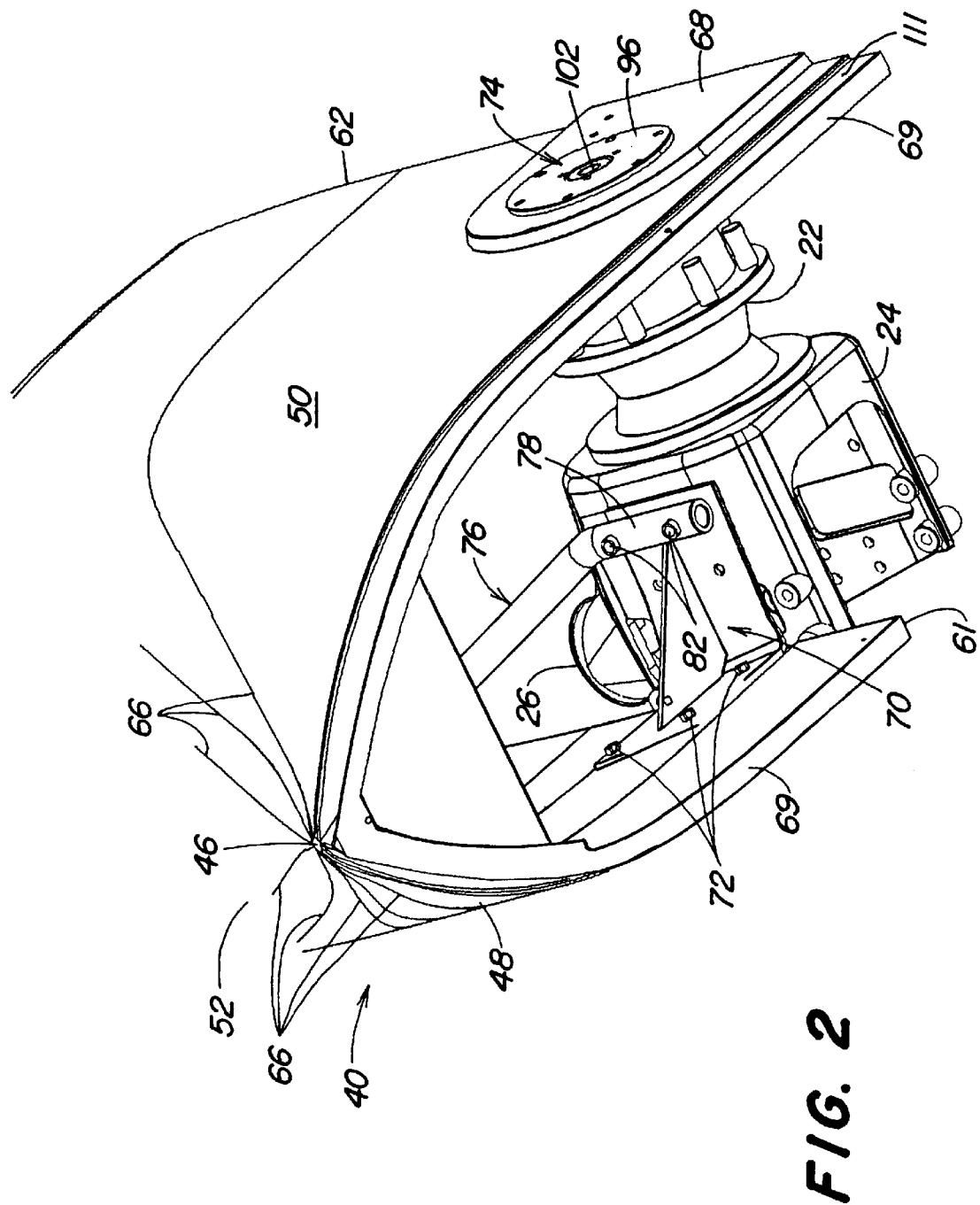
FIG. 2 is a bottom perspective view of the drop axle assembly of FIG. 1 with parts removed to better show the shield and shield mounting structure.
Figure 3:
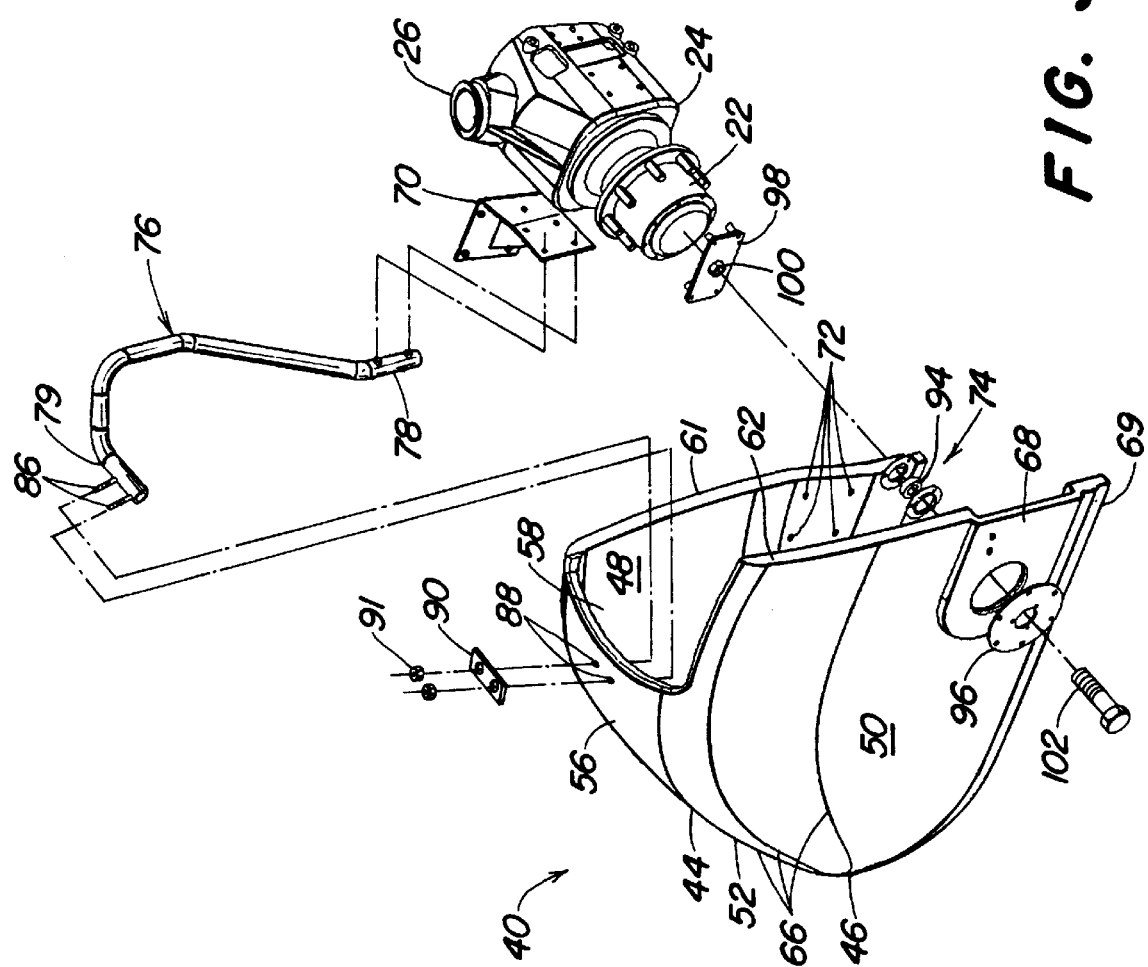
FIG. 3 is an exploded perspective view of a portion of the axle assembly of FIGS. 1 and 2.

The body 44 is shaped for rigidity and strength and includes bend line locations extending rearwardly from the nose portion and indicated generally at 66 in FIGS. 2 and 3. A raised and apertured bearing support area 68 is formed in the outer sidewall 50 and extends forwardly from the aft edge 62 providing added strength and rigidity to the area outwardly adjacent the hub 22. The body 44 terminates in a bottom inwardly stepped edge 69 extending horizontally between the aft edges 61 and 62. As best seen in FIGS. 2 and 3, the inside walls of the double wall shield construction is smooth and substantially devoid of framework or the like so debris sheds easily and does not build up inside the body 44. The outer surface of the body 44 is also relatively smooth. Cleaning of the shields is facilitated by the smooth wall surfaces.

The body 44 is supported from the drop axle assembly 20 by an L-shaped bracket 70 with a first leg bolted to the casting 24 and a second leg bolted to the inside sidewall 48 at locations 72. The body 44 also is carried by a bearing support structure 74 connected to the support area 68 in the outer sidewall 50 and to the hub 22. A rod support and aligning member 76 has a lower end 78 bolted (FIG. 2) to the casting 24 against the first leg of the bracket 70, and an upper end 79 which helps align and support the body 44 during mounting by a single operator. Bolts 82 (FIG. 2) extend through apertures in the lower end of the rod member 76 and in the sideleg of the bracket 70. The member 76 is shaped to extend upwardly and inwardly around the inside of the wheel 14 and then outwardly and forwardly over the top of the wheel. A pair of threaded pins or bolts 86 project vertically from welded connections with the upper end 79 of the rod member 76, and the upper wall 56 includes a pair of mating apertures 88 (FIG. 3) which are received over the pins 86 during mounting. The apertures 88 are located generally above the center of gravity of the body 44 so that the body will be substantially balanced at the pins 86 on the rod member 76 for minimal effort alignment of the apertures at 72 with the apertures in the bracket 70 and alignment of the bearing support structure 74 with the center of the hub 22. An apertured plate 90 is placed over the pins 86 and nuts 91 are threaded onto the pins 86 to clamp the top wall 56 between the plate 90 and the top of the rod member 76.

The bearing support structure 74 includes a bearing assembly 94 connected to a mounting plate 96 fixed to the support area 68 of the outer sidewall 50 by bolts at locations 97 spaced around the plate. A hub plate 98 (FIG. 3) is bolted to the hub 22 and includes a nut 100 welded at a location centered with respect to the hub axis. A bolt 102 is inserted through the inner race of the bearing assembly and threaded into the welded nut 100 to support the body 44 from the hub 22. The inner race of the bearing assembly 94 includes an extended collar which spaces the outer race from the nut 100 to prevent interference and rubbing against the inside wall of the outer sidewall 50. The bearing support structure 74 provides both lateral and vertical support, as well as fore-and-aft support, for the outer sidewall 50 and eliminates need for a U-shaped frame or similar debris-catching frame structure extending around the inside of the plastic body 44.

To reduce shield body damage caused by bottoming of shield structure on the ground or hitting obstacles, the lower edge 69 of the body 44 terminates a short distance below the wheel hub 22 and a substantial distance above the ground. As seen in FIG. 1, the lower edge 69 is offset above the ground a distance at least about half the distance between the axis of the wheel hub 22 and the ground. A flexible shield bottom 110 fabricated from a flat piece of rubber or similar material is connected to the stepped edge 69 by screws 111 or other suitable connectors and extends downwardly to a lowermost edge 112 which is generally horizontal and extends from the rear edge 61 to the rear edge 62. The edge 122 is approximately level with the outer circumference of a wheel rim 114 of the wheel 14 to provide good plant protection without unduly stressing the shield body 44 during ground or obstacle contact. The shield bottom 110 is easily replaceable if it becomes damaged or worn.

Having described the preferred embodiment, it will become apparent that various modifications can be made without departing from the scope of the invention as defined in the accompanying claims.

We claim:

1. In an agricultural vehicle having a frame supported for movement over ground in a forward direction and in a rearward direction by a plurality of wheels, the wheels connected to wheel support structure and including wheel hubs, the wheels adapted for positioning between rows of crop, attachable and removable shield structure for protecting the crop from one of the wheels when attached, comprising:

a plastic wheel shield having a body with a lower, forward nose portion and inside and outside sidewalls extending in the rearward direction from the nose portion, and a top wall connected to the sidewalls;

a support and aligning member connected to the wheel support structure and extending upwardly therefrom to an uppermost shield receiving member, the support and aligning member and the wheel shield including mating structure for at least temporarily supporting substantially the entire weight of the wheel shield independently of separate fasteners during attaching of the shield structure; and bracket structure connected to the wheel support and alignable with a preselected location on one of the sidewalls when the wheel shield is supported on the support and aligning member, and bolt structure connected between the bracket structure and the preselected location and supporting the wheel shield from the wheel support structure.

2. The shield structure as set forth in claim 1 further comprising a bearing connected to the outside sidewall and to one of the wheel hubs for supporting the outer sidewall from one of the wheel hubs and providing support for the body independently of any framework extending around one of the wheels between the sidewalls.

3. The shield structure as set forth in claim 2 including a plate connected to one of the wheel hubs, a nut connected to the plate for rotation with the hub about an axis corresponding to an axis of rotation of one of the wheel hubs, and a bolt extending through the bearing and threaded into the nut connected to the plate.

4. The shield structure as set forth in claim 3 wherein the bearing includes an extended inner race offsetting the outside sidewall from one of the wheel hubs.

5. The shield structure as set forth in claim 1 wherein the support and aligning member includes upper projecting pin structure and the top wall is apertured to thereby define the mating aligning structure.

6. The shield structure as set forth in claim 1 wherein the shield body includes a lower edge, and further comprising a flexible and replaceable shield member connected to shield body and ending downwardly from the lower edge.

7. The shield structure as set forth in claim 1 wherein the shield body includes an inner wall defining an inside of the body and wherein the inside of the body substantially devoid of frame members from the inside sidewall to the outside so that debris is easily shed from the inner wall.

8. The shield structure as set forth in claim 7 wherein the shield body comprises a double wall, rotationally molded structure.

9. The shield structure as set forth in claim 1 wherein the support and aligning member comprises a rod-like member extending upwardly on one side only of one of the wheels to a position over one of the wheels.

10. The shield structure as set forth in claim 9 wherein the rod-like member extends upwardly adjacent the inside sidewall, and further including a bearing connected to the outside sidewall and supporting the outside sidewall from one of the wheel hubs independently of any framework extending between the sidewalls and over one of the wheels.

11. Mountable and removable wheel shield structure for a vehicle having a steerable driven wheel supported on a hub which in turn is supported from a housing, the shield structure comprising:

a plastic body having inner and outer sidewalls located on opposite sides of the wheel and an upper wall connecting the sidewalls;

a bracket connecting the inner sidewall to the housing;
bearing structure supporting the outer sidewall from the hub; and wherein the body includes an interior surface, the shield structure devoid of framework extending between the inner and outer sidewalls, the bracket and bearing structure providing sidewall support for the body.

12. The shield structure as set forth in claim 11 further comprising an alignment member for receiving the body during mounting and aligning the inner sidewall with the bracket and the outer sidewall with the hub.

13. The shield structure as set forth in claim 12 wherein the alignment member includes a rod-like member having a lower end connected to the housing and extending upwardly from the lower end around a side of the wheel to an upper location above the wheel, and mating structure on the body for facilitating aligning of the sidewalls with the bracket and hub during mounting.

14. The shield structure as set forth in claim 13 wherein the upper location includes a upwardly projecting pin, and the body includes an apertured portion received over the pin.

15. The shield structure as set forth in claim 14 wherein the apertured portion is located above the center of gravity of the body for facilitating balancing of the body on the rod-like member during mounting.

16. The shield structure as set forth in claim 14 including means for securing the upper wall to the rod-like member.

17. The shield structure as set forth in claim 11 wherein the body includes a lower edge located adjacent the hub, and the shield structure further includes a selectively attachable flexible shield bottom for protecting plants and for limiting damage to the body when the shield structure strikes an object.

18. The shield structure as set forth in claim 11 wherein the body comprises a rotationally molded, double wall structure having interior generally devoid of framework for shedding debris.

19. The shield structure as set forth in claim 11 including a nut member connected to the hub and a bolt extending through the bearing structure and threaded into the nut member.

20. Mountable and removable wheel shield structure for a vehicle having a wheel supported on a hub which in turn is supported from a housing, the shield structure comprising:

a plastic body having inner and outer sidewalls located on opposite sides of the wheel and an upper wall connecting the sidewalls;

a bracket connecting the inner sidewall to the housing;

bearing structure supporting the outer sidewall from the hub;

wherein the body further includes a nose portion having a lower extremity located below the hub; and further including a replaceable shield member connected to the nose portion of the body and extending downwardly from the lower extremity thereby providing a flexible, replaceable extension of the nose portion.

* * * * *